United States Patent
Kondo

(10) Patent No.: US 9,132,697 B2
(45) Date of Patent: Sep. 15, 2015

(54) MODIFIED NATURAL RUBBER OR MODIFIED NATURAL RUBBER LATEX, AND RUBBER COMPOSITION AND PNEUMATIC TIRE

(75) Inventor: Hajime Kondo, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 2023 days.

(21) Appl. No.: 10/558,389

(22) PCT Filed: Jun. 2, 2004

(86) PCT No.: PCT/JP2004/008014
§ 371 (c)(1),
(2), (4) Date: Nov. 29, 2005

(87) PCT Pub. No.: WO2004/106397
PCT Pub. Date: Dec. 9, 2004

(65) Prior Publication Data
US 2007/0010610 A1   Jan. 11, 2007

(30) Foreign Application Priority Data

| Jun. 2, 2003 | (JP) | 2003-156533 |
| Jun. 2, 2003 | (JP) | 2003-156545 |
| Jun. 2, 2003 | (JP) | 2003-156579 |
| Jun. 2, 2003 | (JP) | 2003-156588 |

(51) Int. Cl.
| B60C 1/00 | (2006.01) |
| C08C 1/14 | (2006.01) |
| C08F 2/22 | (2006.01) |
| C08F 253/00 | (2006.01) |
| C08K 3/04 | (2006.01) |
| C08K 3/36 | (2006.01) |

(52) U.S. Cl.
CPC ............. B60C 1/0016 (2013.04); C08C 1/14 (2013.01); C08F 2/22 (2013.01); C08F 253/00 (2013.01); C08K 3/04 (2013.01); C08K 3/36 (2013.01)

(58) Field of Classification Search
CPC ....... B60C 1/0016; C08C 1/14; C08F 253/00; C08K 3/04; C08K 3/36; C08L 5/00; C08L 51/04

USPC ........................................... 524/575.5
See application file for complete search history.

(56) References Cited

U.S. PATENT DOCUMENTS

| 4,262,097 A | 4/1981 | Dawans et al. |
| 4,569,382 A | 2/1986 | Maxey et al. |
| 6,462,159 B1 * | 10/2002 | Hamada et al. ............... 526/336 |
| 6,512,034 B1 * | 1/2003 | Hamada et al. ............... 524/236 |
| 2002/0170642 A1 * | 11/2002 | Westermann et al. ..... 152/209.5 |
| 2004/0122134 A1 * | 6/2004 | Weydert et al. ................ 524/47 |

FOREIGN PATENT DOCUMENTS

| EP | 0831124 A1 | 3/1998 |
| EP | 0972799 A1 | 1/2000 |
| EP | 1184412 A1 | 3/2002 |
| EP | 1283219 A2 | 2/2003 |
| GB | 788651 A | 1/1958 |
| GB | 1 505 402 A | 3/1978 |
| GB | 2003162 A | 3/1979 |
| JP | 57-197155 A | 12/1982 |
| JP | 02-43233 A | 2/1990 |
| JP | 3-255113 A | 11/1991 |
| JP | 06-329702 A | 11/1994 |
| JP | 08-501338 A | 2/1996 |
| JP | 2001-288228 A | 10/2001 |
| JP | 2002-060584 A | 2/2002 |
| WO | 01/96442 A1 | 12/2001 |

OTHER PUBLICATIONS

Malaysian Office Action issued Nov. 15, 2011, for Application No. PI 20042058 filing date May 28, 2004, 3 pages.

* cited by examiner

*Primary Examiner* — Peter D Mulcahy
(74) *Attorney, Agent, or Firm* — Sughrue Mion, PLLC

(57) ABSTRACT

There are provided a modified natural rubber made from a modified natural rubber latex, in which a polar group-containing monomer is graft-polymerized to natural rubber latex, and a rubber composition comprising such a modified natural rubber and carbon black and/or silica. Also, there are provided a modified natural rubber latex in which a tin-containing monomer or an alkoxysilyl group-containing monomer is graft-polymerized to natural rubber latex and a modified natural rubber made therefrom and a rubber composition comprising such a modified natural rubber.

3 Claims, No Drawings

MODIFIED NATURAL RUBBER OR MODIFIED NATURAL RUBBER LATEX, AND RUBBER COMPOSITION AND PNEUMATIC TIRE

TECHNICAL FIELD

This invention relates to a modified natural rubber or a modified natural rubber latex and a rubber composition using such a modified natural rubber or modified natural rubber latex as well as a pneumatic tire using such a rubber composition.

BACKGROUND ART

There is well-known a technique of grafting natural rubber with a vinyl compound, and MG latex and the like are already produced and are put into a practical use as an adhesive or the like (e.g. JP-A-2000-319339, JP-A-2002-138266). In this grafted natural rubber, however, a greater amount of the vinyl compound (20-50% by weight) is grafted as a monomer for changing the characteristics of natural rubber itself, so that the physical properties inherent to natural rubber (viscoelasticity, stress-strain curve in a tensile test or the like) is largely changed. Also, when the grafted natural rubber is compounded with carbon black and/or silica, the serious viscosity rise is caused to decrease the processability. Furthermore, as a greater amount of the other monomer is introduced into the molecular chain of natural rubber, the physical properties become entirely different from those inherent to natural rubber. Therefore, there is caused a problem that such a grafted natural rubber can not quite utilize the conventional methods making the beat use of the physical properties inherent to natural rubber.

As a technique for improving the reinforcing property and affinity of a polymer with a filer such as carbon black, silica or the like, there are developed a terminal modification, a copolymerization with a monomer containing a functional group and so on in the field of synthetic rubbers. On the other hand, natural rubber is used in a greater amount owing to the excellent physical properties, but there is not known a technique that natural rubber itself is largely improved so as to make the reinforcing property and affinity to the filler equal to those of the above modified synthetic rubber.

On the other hand, there are proposed a technique wherein an ester of a polyvalent alcohol with an unsaturated carboxylic acid, an organic compound having an unsaturated bond, or a vinyl monomer is compounded with natural rubber to conduct graft polymerization, a technique of epoxidizing natural rubber, and so on (e.g. JP-A-5-287121, JP-A-6-329702, JP-A-9-25468, JP-A-2002-348559). Particularly, the former technique is not a technique aiming at the improvement of the reinforcing property and affinity to the filler such as carbon black, silica or the like, but is a technique of largely changing the physical properties inherent to natural rubber. In these techniques, however, there are problems that an odor is generated in the mastication or the like, and a freeze resistance is poor in such an area that ambient temperature becomes not higher than 10° C. in winter season. Furthermore, it can not be said that these techniques develop the sufficient improving effects.

SUMMARY OF THE INVENTION

It is, therefore, an object of the invention to solve the aforementioned problems of the conventional techniques and to provide a modified natural rubber having excellent odor reduction and freeze resistance in storing while maintaining the physical properties inherent to natural rubber.

It is another object of the invention to provide a novel modified natural rubber latex.

It is the other object of the invention to provide a modified natural rubber having excellent reinforcing property and affinity to a filler such as carbon black, silica or the like and capable of improving a loss factor and a wear resistance.

It is a still further object of the invention to provide a rubber composition compounded with the above modified natural rubber and a pneumatic tire using the same.

According to a first aspect of the invention, there is the provision of a modified natural rubber characterized by graft-polymerizing natural rubber latex with a polar group-containing monomer at a grafting ratio of 0.01-5.0% by mass and then coagulating and drying.

According to a second aspect of the invention, there is the provision of a method of producing a modified natural rubber, characterized in that a polar group-containing monomer is added to natural rubber latex and grafted at a grafting ratio of 0.01-5.0% by mass through an emulsion polymerization and then the resulting polymer is coagulated and dried.

In a preferable embodiment of the first and second aspects of the invention, the polar group is at least one selected from the group consisting of amino group, imino group, nitrile group, ammonium group, imido group, amido group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group and oxygen-containing heterocyclic group.

According to a third aspect of the invention, there is the provision of a rubber composition comprising a modified natural rubber, which is obtained by graft-polymerizing natural rubber latex with a polar group-containing monomer and then coagulating and drying, and carbon black and/or silica.

In a preferable embodiment of the third aspect of the invention, a grafting ratio of the polar group-containing monomer is 0.01-5.0% by mass, preferably 0.1-3.0% by mass, more preferably 0.2-1.0% by mass per the natural rubber latex.

In another preferable embodiment of the third aspect of the invention, the polar group is at least one selected from the group consisting of amino group, imino group, nitrile group, ammonium group, imido group, amido group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group and oxygen-containing heterocyclic group.

According to a fourth aspect of the invention, there is the provision of a pneumatic tire characterized by applying a rubber composition described in the third aspect to a tire constituting member.

According to a fifth aspect of the invention, there is the provision of a modified natural rubber latex characterized by adding a tin-containing monomer to natural rubber latex and graft-polymerizing them.

According to a sixth aspect of the invention, there is the provision of a modified natural rubber characterized by adding a tin-containing monomer to natural rubber latex and graft-polymerizing them and then coagulating and drying.

In a preferable embodiment of the fifth and sixth aspects of the invention, the tin-containing monomer is at least one selected from the group consisting of allyl tri-n-butyl tin, allyl trimethyl tin, allyl triphenyl tin, allyl tri-n-octyl tin, (meth)acryloxy n-butyl tin, (meth)acryloxy trimethyl tin, (meth)

acryloxy triphenyl tin, (meth)acryloxy n-octyl tin, vinyl tri-n-butyl tin, vinyl trimethyl tin, vinyl triphenyl tin and vinyl tri-n-octyl tin.

In another preferable embodiment of the fifth and sixth aspects of the invention, a grafting ratio of the tin-containing monomer is 0.01-10.0% by mass per a rubber component of the natural rubber latex.

According to a seventh aspect of the invention, there is the provision of a method of producing a modified natural rubber latex, characterized in that a tin-containing monomer is added to natural rubber latex and grafted through an emulsion polymerization.

According to an eighth aspect of the invention, there is the provision of a method of producing a modified natural rubber, characterized in that a tin-containing monomer is added to natural rubber latex and grafted through an emulsion polymerization, and then the resulting polymer is coagulated and dried.

In a preferable embodiment of the seventh and eighth aspects of the invention, the tin-containing monomer is at least one selected from the group consisting of allyl tri-n-butyl tin, allyl trimethyl tin, allyl triphenyl tin, allyl tri-n-octyl tin, (meth)acryloxy n-butyl tin, (meth)acryloxy trimethyl tin, (meth)acryloxy triphenyl tin, (meth)acryloxy n-octyl tin, vinyl tri-n-butyl tin, vinyl trimethyl tin, vinyl triphenyl tin and vinyl tri-n-octyl tin.

In another preferable embodiment of the seventh and eighth aspects of the invention, a grafting ratio of the tin-containing monomer is 0.01-10.0% by mass per a rubber component of the natural rubber latex.

According to a ninth aspect of the invention, there is the provision of a rubber composition comprising a modified natural rubber described in the sixth aspect and carbon black.

According to a tenth aspect of the invention, there is the provision of a modified natural rubber latex characterized by adding an alkoxysilyl group-containing monomer to natural rubber latex and graft-polymerizing them.

According to an eleventh aspect of the invention, there is the provision of a modified natural rubber characterized by adding an alkoxysilyl group-containing monomer to natural rubber latex and graft-polymerizing them and then coagulating and drying.

In a preferable embodiment of the tenth and eleventh aspects of the invention, a grafting ratio of the alkoxysilyl group-containing monomer is 0.01-10.0% by mass per a rubber component of the natural rubber latex.

According to a twelfth aspect of the invention, there is the provision of a method of producing a modified natural rubber latex, characterized in that an alkoxysilyl group-containing monomer is added to natural rubber latex and grafted through an emulsion polymerization.

According to a thirteenth aspect of the invention, there is the provision of a method of producing a modified natural rubber, characterized in that an alkoxysilyl group-containing monomer is added to natural rubber latex and grafted through an emulsion polymerization and then the resulting polymer is coagulated and dried.

In a preferable embodiment of the twelfth and thirteenth aspects of the invention, a grafting ratio of the alkoxysilyl group-containing monomer is 0.01-10.0% by mass per a rubber component of the natural rubber latex.

According to a fourteenth aspect of the invention, there is the provision of a rubber composition comprising a modified natural rubber described in the eleventh aspect and silica.

BEST MODE FOR CARRYING OUT THE INVENTION

The modified natural rubber according to the first to third aspects of the invention is obtained by adding a polar-group-containing monomer to natural rubber latex and further adding a polymerization initiator and conducting an emulsion polymerization and then coagulating and drying the resulting polymer. Thus, a small amount of the polar group-containing monomer is graft-polymerized (emulsion-polymerized) to the natural rubber latex, so that the physical properties inherent to natural rubber are sufficiently maintained without deteriorating the processability and the reinforcing property and affinity to a filler can be improved. Also, the monomer to be graft-polymerized has a polar group, so that odor produced in the mastication or the like can be decreased. Because, it is guessed that a substance causing the odor is caught by the polar group to bring about the decrease of the odor. Furthermore, the graft polymerization of the polar group-containing monomer to the molecule of the natural rubber somewhat changes the steric structure of the natural rubber molecule to largely delay the static crystallization rate and hence the freeze resistance in the storing at a low-temperature area can be considerably improved. Moreover, when such a modified natural rubber is compounded with a filler such as carbon black, silica or the like to form a rubber composition, the properties such as loss factor, wear resistance and the like can be considerably improved.

The natural rubber latex used in the invention is an ordinary latex and may include a field latex, an ammonia-treated latex, a centrifugally concentrated latex, a deproteinized latex treated with a surfactant or an enzyme and a combination of two or more latexes.

The polar group-containing monomer used in the invention is not particularly limited unless at least one polar group is included in the molecule of the monomer. As a concrete example of the polar group may be preferably mentioned amino group, imino group, nitrile group, ammonium group, imido group, amido group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group and oxygen-containing heterocyclic group. The polar group-containing monomers may be used alone or in a combination of two or more.

As an amino group-containing monomer, there are polymerizable monomers containing in their molecule at least one amino group selected from primary, secondary and tertiary amino groups. Among them, a tertiary amino group-containing monomer such as dialkylaminoalkyl(meth)acrylate or the like is particularly preferable. These amino group-containing monomers may be used alone or in a combination of two or more.

As a primary amino group-containing monomer are mentioned acrylamide, methacrylamide, 4-vinylanilene, aminomethyl(meth)acrylate, aminoethyl(meth)acrylate, aminopropyl(meth)acrylate, aminobutyl(meth)acrylate and so on.

As a secondary amino group-containing monomer are mentioned (1) anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilinostyrene, α-carboxy-β-carboxy-β-phenyl-p-anilinostyrene and the like; (2) anilinophenyl butadienes such as 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and the like; and (3) N-monosubstituted (meth)acrylamides such as N-methyl(meth)acrylamide, N-ethyl(meth)acrylamide, N-methylol acrylamide, N-(4-anilinophenyl)methacrylamide and the like.

As a tertiary amino group-containing monomer are mentioned N,N-disubstituted aminoalkyl acrylate, N,N-disubstituted aminoalkyl acrylamide, vinyl compound containing pyridyl group and so on.

As the N,N-disubstituted aminoalkyl acrylate are mentioned esters of acrylic acid or methacrylic acid such as N,N-dimethylaminomethyl(meth)acrylate, N,N-dimethylaminoethyl(meth)acrylate, N,N-dimethylaminopropyl(meth)acrylate, N,N-dimethylaminobutyl(meth)acrylate, N,N-diethylaminoethyl(meth)acrylate, N,N-diethylaminopropyl(meth)acrylate, N,N-diethylaminobutyl(meth)acrylate, N-methyl-N-ethylaminoethyl(meth)acrylate, N,N-dipropylaminoethyl(meth)acrylate, N,N-dibutylaminoethyl(meth)acrylate, N,N-dibutylaminopropyl(meth)acrylate, N,N-dibutylaminobutyl(meth)acrylate, N,N-dihexylaminoethyl(meth)acrylate, N,N-diocytylaminoethyl(meth)acrylate, acryloylmorpholine and so on. Particularly, N,N-dimethylaminoethyl(meth)acrylate, N,N-diethylaminoethyl(meth)acrylate, N,N-dipropylaminoethyl(meth)acrylate, N,N-dioctylaminoethyl(meth)acrylate, N-methyl-N-ethylaminoethyl(meth)acrylate and the like are preferable.

As the N,N-disubstituted aminoalkyl acrylamide are mentioned acrylamide compounds or methacrylamide compounds such as N,N-dimethylaminomethyl(meth)acrylamide, N,N-dimethylaminoethyl(meth)acrylamide, N,N-dimethylaminopropyl(meth)acrylamide, N,N-dimethylaminobutyl(meth)acrylamide, N,N-diethylaminoethyl(meth)acrylamide, N,N-diethylaminopropyl(meth)acrylamide, N,N-diethylaminobutyl(meth)acrylamide, N-methyl-N-ethylaminoethyl(meth)acrylamide, N,N-dipropylaminoethyl(meth)acrylamide, N,N-dibutylaminoethyl(meth)acrylamide, N,N-dibutylaminopropyl(meth)acrylamide, N,N-dibutylaminobutyl(meth)acrylamide, N,N-dihexylaminoethyl(meth)acrylamide, N,N-dihexylaminopropyl(meth)acrylamide, N,N-dioctylaminopropyl(meth)acrylamide and so on. Particularly, N,N-dimethylaminopropyl(meth)acrylamide, N,N-diethylaminopropyl(meth)acrylamide, N,N-dioctylaminopropyl(meth)acrylamide and the like are preferable.

Also, a nitrogen-containing heterocyclic group may be used instead of the amino group. As a nitrogen-containing heterocycle are mentioned pyrrole, histidine, imidazole, triazolidine, triazole, triazine, pyridine, pyrimidine, pyrazine, indole, quinoline, purine, phenazine, pteridine, melamine and so on. The nitrogen-containing heterocycle may contain the other heteroatom in its ring.

As the vinyl compound containing pyridyl group are mentioned, for example, 2-vinylpyridine, 3-vinylpyridine, 4-vinylpyridine, 5-methyl-2-vinylpyridine, 5-ethyl-2-vinylpyridine and so on. Particularly, 2-vinylpyridine, 4-vinylpyridine and the like are preferable.

As the nitrile group-containing monomer are (meth)acrylonitrile, vinylidene cyanide and so on. They may be used alone or in a combination of two or more.

As the hydroxyl group-containing monomer are mentioned polymerizable monomers having in one molecule at least one hydroxyl group selected from primary, secondary and tertiary hydroxyl groups. As such a monomer, there are hydroxyl group-containing unsaturated carboxylic acid monomers, hydroxyl group-containing vinyl ether monomers, hydroxyl group-containing vinylketone monomers and the like. As a concrete example of such a hydroxyl group-containing monomer, there are hydroxyalkyl(meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate and the like; mono(meth)acrylates of polyalkylene glycol (number of alkylene glycol units is, for example, 2-23) such as polyethylene glycol, polypropylene glycol and the like; hydroxyl group-containing unsaturated amides such as N-hydroxymethyl(meth)acrylamide, N-(2-hydroxyethyl) (meth)acrylamide, N,N-bis(2-hydroxymethyl) (meth)acrylamide and the like; hydroxyl group-containing vinylaromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like; and (meth)acrylates. Among them, the hydroxyl group-containing unsaturated carboxylic acid monomers, hydroxyalkyl(meth)acrylates, hydroxyl group-containing vinylaromatic compounds are preferable, and the hydroxyl group-containing unsaturated carboxylic acid monomers are particularly preferable. As the hydroxyl group-containing unsaturated carboxylic acid monomer, there are esters, amides, anhydrides and the like of acrylic acid, methacrylic acid, itaconic acid, fumaric acid, maleic acid and the like, and ester compounds of acrylic acid and methacrylic acid are particularly preferable.

As the carboxyl group-containing monomer are mentioned unsaturated carboxylic acids such as (meth)acrylic acid, maleic acid, fumaric acid, itaconic acid, tetraconic acid, cinnamic acid and the like; free carboxyl group-containing esters such as monoesters of a non-polymerizable polyvalent carboxylic acid such as phthalic acid, succinic acid, adipic acid or the like with a hydroxy group-containing unsaturated compound such as (meth)allylalcohol, 2-hydroxyethyl(meth)acrylate or the like, and salts thereof. Among them, the unsaturated carboxylic acids are particularly preferable. These monomers may be used alone or in a combination of two or more.

As the epoxy group-containing monomer are mentioned (meth)allyl glycidyl ether, glycidyl(meth)acrylate, 3,4-oxycyclohexyl(meth)acrylate and so on. These monomers may be used alone or in a combination of two or more.

As the initiator for graft polymerization, use may be made of various initiators, e.g. an initiator for emulsion polymerization and the like without being particularly limited, and also the method of adding the initiator is not particularly limited. As the usually used initiator are mentioned benzoyl peroxide, hydrogen peroxide, cummene hydroperoxide, tert-butyl hydroperoxide, di-tert-butyl peroxide, 2,2-azobisisobutylonitrile, 2,2-azobis(2-diaminopropane)hydrochloride, 2,2-azobis(2-diaminopropane)dihydrochloride, 2,2-azobis(2,4-dimethyl-valeronitrile), potassium persulfate, sodium persulfate, ammonium persulfate and so on. Moreover, it is preferable to use a redox type polymerization initiator for lowering the polymerization temperature. As a reducing agent to be combined with a peroxide used in the redox type polymerization initiator are mentioned tetraethylene pentamine, mercaptanes, acidic sodium sulfite, reducing metal ion, ascorbic acid and so on. Particularly, a combination of tert-butyl hydroperoxide and tetraethylene pentamine is preferable as the redox type polymerization initiator.

The graft polymerization according to the invention is a usual emulsion polymerization wherein the polar group-containing monomer is added to natural rubber latex and polymerized at a given temperature with stirring. In this case, the polar group-containing monomer is previously added with water and an emulsifying agent and sufficiently emulsified and added to the natural rubber latex, or the polar group-containing monomer is directly added to natural rubber latex and an emulsifying agent may be added before or after the addition of the polar group-containing monomer, if necessary. The emulsifying agent is not particularly limited and includes, for example, a nonionic surfactant such as polyoxyethylene lauryl ether or the like.

Considering that the freeze resistance and odor reduction are improved while maintaining the physical properties inherent to natural rubber, or considering that the loss factor and wear resistance are improved without deteriorating the processability in the compounding with carbon black or silica, it is important to evenly introduce a small amount of the polar group into the natural rubber molecule. For this end, an amount of the polymerization initiator added is preferably 1-100 mol %, more preferably 10-100 mol % per 100 mol of the polar group-containing monomer. The aforementioned components are charged into a reaction vessel and graft-polymerized at 30-80° C. for 10 minutes to 7 hours to obtain a modified natural rubber latex. The thus obtained modified natural rubber latex is further coagulated and washed and dried by using a drying machine such as vacuum drier, air drier, drum drier or the like to obtain a modified natural rubber.

In the modified natural rubber according to the invention, a grafting ratio of the polar group-containing monomer is preferably 0.01-5% by mass, more preferably 0.1-3.0% by mass, most preferably 0.2-1% by mass based on a rubber component of the natural rubber latex. When the grafting ratio of the polar group-containing monomer is less than 0.01% by mass, there is a fear that the effect of improving the odor reduction or the freeze resistance in the storing is not sufficiently obtained or the effect of improving the loss factor and wear resistance in the rubber composition is not sufficiently obtained. While, when the grafting ratio exceeds 5% by mass, the physical properties inherent to natural rubber (viscoelasticity, stress-strain curve in a tensile test or the like) is largely changed and hence the conventional methods making the beat use of the physical properties inherent to natural rubber can not be quite utilized and also there is a fear that the processability is largely deteriorated.

The rubber composition according to the third aspect of the invention comprises the above modified natural rubber as a rubber component. In this case, it is preferable that the content of the modified natural rubber is at least 15% by mass. When the content is less than 15% by mass, there is a fear that the effect of improving the loss factor and wear resistance as the rubber composition is not obtained.

As a rubber component used together with the modified natural rubber are mentioned usual natural rubber and diene-based synthetic rubbers. As the diene-based synthetic rubber, there are styrene-butadiene copolymer (SBR), polybutadiene (BR), polyisoprene (IR), butyl rubber (IIR), ethylene-propylene copolymer and a mixture thereof.

Further, the rubber composition contains carbon black and/or silica as a filler. An amount of the filler compounded is 30-120 parts by mass based on 100 parts by mass of the rubber component. When the amount is less than 30 parts by mass, the effect of improving the reinforcing property and other properties is not sufficiently developed, while when it exceeds 120 parts by mass, the processability lowers.

As the carbon black can be used all of commercially available ones. Among them, it is preferable to use carbon blacks of SAF, ISAF, HAF, FEF and GPF grades. As the silica can be used all of commercially available ones. Among them, it is preferable to use wet silica, dry silica or colloidal silica. Particularly, silica is preferable to have a BET of not less than 150 $m^2/g$, more preferably not less than 170 $m^2/g$, most preferably not less than 190 $m^2/g$. As the silica satisfying such a requirement, there are commercially available products such as Nipsil AQ, Nipsil KQ and the like.

The rubber composition can be properly compounded with the additives usually used in the rubber industry such as other reinforcing filler, vulcanizing agent, vulcanization accelerator, antioxidant, softening agent and the like, if necessary.

Further, the fourth aspect of the invention lies in a pneumatic tire applying the above rubber composition to a tire constituting member. Since the rubber composition according to the third aspect of the invention considerably improves the properties such as loss factor, wear resistance and the like as previously mentioned, it is particularly preferable to use such a rubber composition in a tire tread.

The modified natural rubber latex according to the fifth aspect of the invention is obtained by adding a tin-containing monomer to the natural rubber latex and further adding the polymerization initiator to conduct emulsion polymerization. Also, the modified natural rubber according to the sixth aspect of the invention is obtained by coagulating and drying the thus obtained polymer product. In the modified natural rubber obtained by introducing the tin-containing monomer into the natural rubber molecule, the reinforcing property and affinity to carbon black are largely improved and hence the effect of considerably improving the loss factor and wear resistance is developed in the rubber composition compounded with carbon black.

The natural rubber latex and polymerization initiator used in the fifth and sixth aspects are the same as previously mentioned.

As the tin-containing monomer, mention may be made of allyl tri-n-butyl tin, allyl trimethyl tin, allyl triphenyl tin, allyl tri-n-octyl tin, (meth)acryloxy n-butyl tin, (meth)acryloxy trimethyl tin, (meth)acryloxy triphenyl tin, (meth)acryloxy n-octyl tin, vinyl tri-n-butyl tin, vinyl trimethyl tin, vinyl triphenyl tin, vinyl tri-n-octyl tin and so on. These tin-containing monomers may be used alone or in a combination of two or more.

The above graft polymerization is a usual emulsion polymerization wherein the tin-containing monomer is added to the natural rubber latex and polymerized at a given temperature with stirring. In this case, the tin-containing monomer is previously added with water and an emulsifying agent and sufficiently emulsified and added to the natural rubber latex, or the tin-containing monomer is directly added to natural rubber latex and an emulsifying agent may be added before or after the addition of the tin-containing monomer, if necessary. The emulsifying agent is not particularly limited and includes, for example, a nonionic surfactant such as polyoxyethylene lauryl ether or the like.

Considering that the modified natural rubber is compounded with carbon black to form a rubber composition improving the loss factor and wear resistance without deteriorating the processability, it is important to evenly introduce a small amount of a polar group in the tin-containing monomer into the natural rubber molecule. For this end, an amount of the polymerization initiator added is preferably 1-100 mol %, more preferably 10-100 mol % per 100 mol of the tin-containing monomer. The aforementioned components are charged into a reaction vessel and graft-polymerized at 30-80° C. for 10 minutes to 7 hours to obtain a modified natural rubber latex. The thus obtained modified natural rubber latex may be used at a latex state as it is, or may be used at a solid state after the coagulation and drying. In case of applying to the rubber composition, it is preferable to use as a solid rubber. In case of the solid rubber, the rubber latex is first coagulated and washed and then dried by using a drying machine such as vacuum drier, air drier, drum drier or the like.

In the modified natural rubber latex and the modified natural rubber according to the fifth and sixth aspects of the invention, a grafting ratio of the tin-containing monomer is preferable to be 0.01-10% by mass based on a rubber component of the natural rubber latex. When the grafting ratio of the tin-containing monomer is less than 0.01% by mass, there is a fear that the effect of improving the loss factor and wear resistance as the rubber composition is not sufficiently obtained. While, when the grafting ratio exceeds 10% by mass, the physical properties inherent to natural rubber (viscoelasticity, stress-strain curve in a tensile test or the like) is largely changed and hence the conventional methods making the beat use of the physical properties inherent to natural rubber can not be quite utilized and also there is a fear that the processability is largely deteriorated.

When the above modified natural rubber is compounded with carbon black to prepare a rubber composition, the reinforcing property and affinity to carbon black are improved as compared with those in the conventional rubber composition comprising non-modified natural rubber and carbon black and hence the loss factor and wear resistance are considerably improved. Moreover, all of commercially available carbon blacks can be used. Among them, it is preferable to use carbon blacks of SAF, ISAF, HAF, FEF and GPF grades.

The rubber composition according to the eighth aspect of the invention may be properly compounded with the additives usually used in the rubber industry such as other reinforcing filler, vulcanizing agent, vulcanization accelerator, antioxidant, softening agent and the like, if necessary.

The modified natural rubber latex according to the ninth aspect of the invention is obtained by adding an alkoxysilyl group-containing monomer to the natural rubber latex and further adding the polymerization initiator to conduct emulsion polymerization. Also, the modified natural rubber according to the tenth aspect of the invention is obtained by coagulating and drying the thus obtained polymer product. In the modified natural rubber obtained by introducing the alkoxysilyl group-containing monomer into the natural rubber molecule, the reinforcing property and affinity to silica are largely improved and hence the effect of considerably improving the loss factor and wear resistance is developed in the rubber composition compounded with silica.

The natural rubber latex and polymerization initiator used in the ninth and tenth aspects are the same as previously mentioned.

As the alkoxysilyl group-containing monomer, mention may be made of (meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethylmethoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane, γ-(meth)acryloxypropyl dimethylbenzyloxysilane, trimethoxy vinylsilane, triethoxy vinylsilane, 6-trimethoxysilyl-1,2-hexene, p-trimethoxysilyl styrene and so on. These alkoxysilyl group-containing monomers may be used alone or in a combination of two or more.

The above graft polymerization is a usual emulsion polymerization wherein the alkoxysilyl group-containing monomer is added to the natural rubber latex and polymerized at a given temperature with stirring. In this case, the alkoxysilyl group-containing monomer is previously added with water and an emulsifying agent and sufficiently emulsified and added to the natural rubber latex, or the alkoxysilyl group-containing monomer is directly added to natural rubber latex and an emulsifying agent may be added before or after the addition of the alkoxysilyl group-containing monomer, if necessary. The emulsifying agent is not particularly limited and includes, for example, a nonionic surfactant such as polyoxyethylene lauryl ether or the like.

Considering that the modified natural rubber is compounded with silica to form a rubber composition improving the loss factor and wear resistance without deteriorating the processability, it is important to evenly introduce a small amount of a polar group in the alkoxysilyl group-containing monomer into the natural rubber molecule. For this end, an amount of the polymerization initiator added is preferably 1-100 mol %, more preferably 10-100 mol % per 100 mol of the alkoxysilyl group-containing monomer. The aforementioned components are charged into a reaction vessel and graft-polymerized at 30-80° C. for 10 minutes to 7 hours to obtain a modified natural rubber latex. The thus obtained modified natural rubber latex may be used at a latex state as it is, or may be used at a solid state after the coagulation and drying. In case of applying to the rubber composition, it is preferable to use as a solid rubber. In case of the solid rubber, the rubber latex is first coagulated and washed and then dried by using a drying machine such as vacuum drier, air drier, drum drier or the like.

In the modified natural rubber latex and the modified natural rubber according to the ninth and tenth aspects of the invention, a grafting ratio of the alkoxysilyl group-containing monomer is preferable to be 0.01-10% by mass based on a rubber component of the natural rubber latex. When the grafting ratio of the alkoxysilyl group-containing monomer is less than 0.01% by mass, there is a fear that the effect of improving the loss factor and wear resistance as the rubber composition is not sufficiently obtained. While, when the grafting ratio exceeds 10% by mass, the physical properties inherent to natural rubber (viscoelasticity, stress-strain curve in a tensile test or the like) is largely changed and hence the conventional methods making the beat use of the physical properties inherent to natural rubber can not be quite utilized and also there is a fear that the processability is largely deteriorated.

When the above modified natural rubber is compounded with silica to prepare a rubber composition, the reinforcing property and affinity to silica are improved as compared with those in the conventional rubber composition comprising non-modified natural rubber and silica and hence the loss factor and wear resistance are considerably improved. Moreover, all of commercially available silicas can be used. Among them, it is preferable to use wet silica, dry silica and colloidal silica.

The rubber composition according to the fourteenth aspect of the invention may be properly compounded with the additives usually used in the rubber industry such as other reinforcing filler, vulcanizing agent, vulcanization accelerator, antioxidant, softening agent and the like, if necessary.

The following examples are given in illustration of the invention and are not intended as limitations thereof.

Production Example 1

(1) Step of Modifying Natural Rubber Latex

A field latex is subjected to a centrifugal separation with a latex separator (made by Saito Enshin Kogyo Co., Ltd.) at a revolution speed of 7500 rpm to obtain a concentrated latex having a dry rubber concentration of 60%. 1000 g of the concentrated latex is charged into a stainless reaction vessel provided with a stirrer and a temperature-regulated jacket, and an emulsion previously formed by adding 10 ml of water and 90 mg of an emulsifying agent (Emulgen 1108, made by Kao Corporation) to 30 g of N-N-diethylaminoethyl methacrylate is added together with 990 ml of water, and then stirred for 30 minutes while bubbling with nitrogen. Then, 1.2 g of tert-butyl hydro-peroxide and 1.2 g of tetraethylene pentamine are added as a polymerization initiator to conduct reaction at 40° C. for 30 minutes, whereby a modified natural rubber latex is obtained.

(2) Step of Coagulation and Drying

Then, the modified natural rubber latex is coagulated by adding formic acid to adjust pH to 4.7. The thus obtained solid matter is treated by a clapper 5 times and crumbed through a shredder and dried by a hot air drier at 110° C. for 210 minutes to obtain a modified natural rubber A. It is confirmed from the weight of the thus obtained modified natural rubber A that a conversion of N,N-dimethylaminoethyl methacrylate as a polar group-containing monomer is 100%. Also, as the separation of a homopolymer is carried out by extracting the modified natural rubber A with a petroleum ether and further extracting with a 2:1 mixed solvent of acetone and methanol, it is confirmed that the homopolymer is not detected from the analysis of the extract and 100% of the monomer added is introduced into the natural rubber molecule. In this example, 3.0 g of N,N-dimethylaminoethyl methacrylate is added to 600 g of latex (60% of 1000 g of the concentrated latex), so that the grafting ratio is 3.0/600=0.5%.

Production Examples 2-8

Modified natural rubbers B. C, D, E, F, G, H are obtained in the same manner as in Production Example 1 except that 2.1 g of 2-hydroxyethyl methacrylate in Production Example 2, 1.7 g of 4-vinylpyridine in Production Example 3, 2.1 g of itaconic acid in Production Example 4, 1.4 g of methacrylic acid in Production Example 5, 1.7 g of acrylonitrile in Production Example 6, 2.3 g of glycidyl methacrylate in Production Example 7 and 2.8 g of methacrylamide in Production Example 8 are used instead of 3.0 g of N,N-diethylaminoethyl methacrylate, respectively. As the modified natural rubbers B-H are analyzed in the same manner as in Production Example 1, it is confirmed that 100% of the monomer added is introduced into the natural rubber molecule.

Production Examples 9, 10

Modified natural rubbers I, J are obtained in the same manner as in Production Example 1 except that the addition amount and kind of the polar group-containing monomer, amounts of the emulsifying agent and polymerization initiator and the reaction time are changed as shown in Table 1, respectively. As the modified natural rubbers I, J are analyzed in the same manner as in Production Example 1, it is conformed that a conversion of the monomer is 98.2% in the modified natural rubber 1 and 98.7% in the modified natural rubber J, respectively. Also, as the amount of homopolymer is analyzed by extraction, it is confirmed to be 4.8% of the monomer in the modified natural rubber 1 and 4.1% of the monomer in the modified natural rubber J, respectively.

Production Example 11

A solid natural rubber K is obtained by directly coagulating and drying natural rubber latex without modification.

Production Examples 12-15

Modified natural rubbers L, M, N are obtained in the same manner as in Production Example 1 except that 3.0 g of N,N-dimethylvinyl benzylamine in Production Example 12, 3.0 g of N-(3-dimethylaminopropyl)methacrylamide in Production Example 13, 3.0 g of N-(3-dimethylaminopropyl) acrylamide in Production Example 14 and 1.7 g of 2-vinylpyridine in Production Example 15 are used instead of 3.0 g of N,N-diethylaminoethyl methacrylate, respectively. As the modified natural rubbers L-N are analyzed in the same manner as in Production Example 1, it is confirmed that 100% of the monomer added is introduced into the natural rubber molecule.

TABLE 1

| Modified natural rubber | Polar group-containing monomer | Addition amount (g) | Addition amount of surfactant (g) | t-BHPO (g) | TEPA (g) | Reaction time |
|---|---|---|---|---|---|---|
| A | N,N-diethylaminoethyl methacrylate | 3.0 | 0.09 | 1.2 | 1.2 | 30 minutes |
| B | 2-hydroxyethyl methacrylate | 2.1 | 0.09 | 1.2 | 1.2 | 30 minutes |
| C | 4-vinylpyridine | 1.7 | 0.09 | 1.2 | 1.2 | 30 minutes |
| D | itaconic acid | 2.1 | 0.09 | 1.2 | 1.2 | 30 minutes |
| E | methacrylic acid | 1.4 | 0.09 | 1.2 | 1.2 | 30 minutes |
| F | acrylonitrile | 1.7 | 0.09 | 1.2 | 1.2 | 30 minutes |
| G | glycidyl methacrylate | 2.3 | 0.09 | 1.2 | 1.2 | 30 minutes |
| H | methacrylamide | 2.8 | 0.09 | 1.2 | 1.2 | 30 minutes |
| I | N,N-diethylaminoethyl methacrylate | 60.0 | 1.8 | 0.6 | 0.6 | 2 hours |
| J | 2-hydroxyethyl methacrylate | 60.0 | 1.8 | 0.6 | 0.6 | 2 hours |
| K | — | — | — | — | — | — |
| L | N,N-dimethylvinyl benzylamine | 3.0 | 0.09 | 1.2 | 1.2 | 30 minutes |
| M | N-(3-dimethylaminopropyl) methacrylamide | 3.0 | 0.09 | 1.2 | 1.2 | 30 minutes |
| N | N-(3-dimethylaminopropyl) | 3.0 | 0.09 | 1.2 | 1.2 | 30 minutes |

TABLE 1-continued

| Modified natural rubber | Polar group-containing monomer | Addition amount (g) | Addition amount of surfactant (g) | t-BHPO (g) | TEPA (g) | Reaction time |
|---|---|---|---|---|---|---|
| O | acrylamide 2-vinylpyridine | 1.7 | 0.09 | 1.2 | 1.2 | 30 minutes |

Examples 1-12, Comparative Examples 1-3

With respect to the modified natural rubbers A-O of Production Examples 1-15, the hardness and odor concentration are measured by the following methods to obtain results as shown in Table 2.

The hardness is measured according to JIS K6253 (1997) after each of the modified natural rubbers is kept in a refrigerator of 5° C. for 84 hours or in air of 24° C. for 48 hours.

The odor concentration is measured as follows. At first, each modified natural rubber is masticated, and at a time of reaching a masticating temperature to 140° C., an odor gas is gathered from an discharge port of a mixing machine into a tedlar bag through a pump. Then, a regulated amount of air having no odor is charged into a sampling bag through a pump and sealed with a stopper, and a given amount of odor gas sample is taken out from the tedlar bag through an injection syringe and poured into the sampling bag to obtain a diluted odor gas sample. The odor of the diluted odor gas sample is smelled by four panelists to measure a multiple of dilution until the odor is not feelingly smelled and an average value thereof is calculated. The odor concentration is evaluated by the average value of the dilution multiple, in which the smaller the value, the lower the odor.

a vulcanizate such as tensile strength MPa), loss factor (tan δ, 50° C.) and wear resistance (represented by an index on the basis that Comparative Example 4 or 5 is 100) are measured after the rubber composition of the compounding recipe I is vulcanized at 145° C. for 33 minutes and the rubber composition of the compounding recipe II is vulcanized at 160° C. for 15 minutes. The measured results are shown in Table 4.

Moreover, the measuring method of each property is as follows.

(1) The Mooney Viscosity of the Rubber Composition ($ML_{1+4}$, 130° C.) is Measured According to JIS K6300-1994.

(2) Tensile Strength

A strength at break (Tb) is measured according to JIS K6301-1995.

(3) tan δ

A value of tan δ is measured by using a viscoelasticity measuring device (made by Rheometrix Corporation) under conditions that a temperature is 50° C., a strain is 5% and a frequency is 15 Hz. The smaller the value, the lower the loss factor.

(4) Wear Resistance

The wear resistance is evaluated by measuring a worn amount at a slip ratio of 60% and room temperature by means of a Lambourn abrasion tester and represented by an index on the basis that Comparative Example 4 or 5 is 100. The larger the index value, the better the wear resistance.

TABLE 2

| | Example 1 | Example 2 | Example 3 | Example 4 | Example 5 | Example 6 | Example 7 | Example 8 |
|---|---|---|---|---|---|---|---|---|
| Modified natural rubber | A | B | C | D | E | F | G | H |
| Hardness at 24° C. (keeping for 84 hours) | 20 | 20 | 20 | 19 | 20 | 20 | 20 | 21 |
| Hardness in refrigeration of 5° C. (keeping for 84 hours) | 22 | 21 | 23 | 21 | 22 | 23 | 22 | 24 |
| Odor concentration | 150 | 100 | 150 | 200 | 200 | 100 | 100 | 150 |

| | Comparative Example 1 | Comparative Example 2 | Comparative Example 3 | Example 9 | Example 10 | Example 11 | Example 12 |
|---|---|---|---|---|---|---|---|
| Modified natural rubber | I | J | K | L | M | N | O |
| Hardness at 24° C. (keeping for 84 hours) | 37 | 35 | 20 | 20 | 21 | 20 | 20 |
| Hardness in refrigeration of 5° C. (keeping for 84 hours) | 39 | 38 | 42 | 21 | 23 | 23 | 22 |
| Odor concentration | 1200 | 500 | 2000 | 150 | 200 | 200 | 150 |

Examples 13-40, Comparative Examples 4-5

A rubber composition is prepared by using the modified natural rubbers A-J and L-O obtained in Production Examples 1-10 and 12-15, respectively, according to a compounding recipe I or II shown in Table 3. For the comparison, a rubber composition is prepared by using the natural rubber K of Production Example 11 according to the same compounding recipe.

With respect to these rubber compositions is measured a Mooney viscosity ($ML_{1+4}$, 130° C.). Further, the properties of

TABLE 3

| | Compounding recipe I (part by mass) | Compounding recipe II (part by mass) |
|---|---|---|
| Modified natural rubber | 100 | 100 |
| Carbon black N339 | 50 | |

TABLE 3-continued

|  | Compounding recipe I (part by mass) | Compounding recipe II (part by mass) |
|---|---|---|
| Silica *1 |  | 55 |
| Silane coupling agent *2 |  | 5.5 |
| Aromatic oil | 5 | 10 |
| Stearic acid | 2 | 2 |
| Antioxidant 6C *3 | 1 | 1 |
| Zinc white | 3 | 3 |
| Vulcanization accelerator DZ *4 | 0.8 |  |
| Vulcanization accelerator DPG *5 |  | 1 |
| Vulcanization accelerator DM *6 |  | 1 |
| Vulcanization accelerator NS *7 |  | 1 |
| Sulfur | 1 | 1.5 |

*1: Nipsil AQ, made by Nippon Silica Kogyo Co., Ltd.
*2: Si69, made by Degussa, bis(3-triethoxysiylypropyl) tetrasulfide
*3: N-(1,3'-dimethylbutyl)-N'-phenyl-p-phenylene diamine
*4: N,N'-dicyclohexyl-2-benzothiazolyl sulfenamide
*5: diphenyl guanidine
*6: dibenzothiazyl disulfide
*7: N-t-butyl-2-benzothiazyl sulfenamide

TABLE 4

| | Compounding recipe I ||||| 
|---|---|---|---|---|---|
| | Example 13 | Example 14 | Example 15 | Example 16 | Example 17 |
| Modified natural rubber | A | B | C | D | E |
| Mooney viscosity ($ML_{1+4}$, 130° C.) | 78 | 75 | 76 | 77 | 75 |
| Tb (MPa) | 27.3 | 27.1 | 27.0 | 27.0 | 26.8 |
| tan δ (50° C.) | 0.153 | 0.157 | 0.151 | 0.162 | 0.163 |
| Wear resistance (index) | 125 | 125 | 122 | 117 | 116 |

| | Compounding recipe I ||||| 
|---|---|---|---|---|---|
| | Example 18 | Example 19 | Example 20 | Example 21 | Example 22 |
| Modified natural rubber | F | G | H | I | J |
| Mooney viscosity ($ML_{1+4}$, 130° C.) | 72 | 74 | 75 | 92 | 89 |
| Tb (MPa) | 27.2 | 26.9 | 26.7 | 25.8 | 26.1 |
| tan δ (50° C.) | 0.165 | 0.165 | 0.166 | 0.172 | 0.173 |
| Wear resistance (index) | 124 | 114 | 114 | 105 | 106 |

| | Compounding recipe I ||||| 
|---|---|---|---|---|---|
| | Comparative Example 4 | Example 23 | Example 24 | Example 25 | Example 26 |
| Modified natural rubber | K | L | M | N | O |
| Mooney viscosity ($ML_{1+4}$, 130° C.) | 73 | 75 | 74 | 73 | 76 |
| Tb (MPa) | 25.3 | 27.2 | 27.1 | 27.2 | 26.9 |
| tan δ (50° C.) | 0.182 | 0.153 | 0.155 | 0.156 | 0.152 |
| Wear resistance (index) | 100 | 124 | 121 | 120 | 123 |

| | Compounding recipe II ||||| 
|---|---|---|---|---|---|
| | Example 27 | Example 28 | Example 29 | Example 30 | Example 31 |
| Modified natural rubber | A | B | C | D | E |
| Mooney viscosity ($ML_{1+4}$, 130° C.) | 90 | 91 | 88 | 90 | 89 |
| Tb (MPa) | 25.2 | 25.3 | 24.9 | 24.8 | 24.9 |
| tan δ (50° C.) | 0.101 | 0.098 | 0.113 | 0.109 | 0.110 |
| Wear resistance index) | 124 | 126 | 114 | 115 | 113 |

| | Compounding recipe II ||||| 
|---|---|---|---|---|---|
| | Example 32 | Example 33 | Example 34 | Example 35 | Example 36 |
| Modified natural rubber | F | G | H | I | J |
| Mooney viscosity ($ML_{1+4}$, 130° C.) | 85 | 90 | 88 | 97 | 99 |

TABLE 4-continued

| | | | | | |
|---|---|---|---|---|---|
| Tb (MPa) | 25.0 | 25.1 | 25.0 | 24.0 | 24.3 |
| tan δ (50° C.) | 0.114 | 0.104 | 0.108 | 0.120 | 0.118 |
| Wear resistance index | 128 | 122 | 118 | 107 | 105 |

| | Compounding recipe II | | | | |
|---|---|---|---|---|---|
| | Comparative Example 5 | Example 37 | Example 38 | Example 39 | Example 40 |
| Modified natural rubber | K | L | M | N | O |
| Mooney viscosity (ML$_{1+4}$, 130° C.) | 86 | 89 | 88 | 89 | 87 |
| Tb (MPa) | 23.7 | 25.2 | 25.1 | 24.8 | 25.0 |
| tan δ (50° C.) | 0.129 | 0.106 | 0.113 | 0.110 | 0.111 |
| Wear resistance index | 100 | 121 | 115 | 116 | 116 |

Production Example 16

(1) Step of Modifying Natural Rubber Latex

A field latex is subjected to a centrifugal separation with a latex separator (made by Saito Enshin Kogyo Co., Ltd.) at a revolution speed of 7500 rpm to obtain a concentrated latex having a dry rubber concentration of 60%. 1000 g of the concentrated latex is charged into a stainless reaction vessel provided with a stirrer and a temperature-regulated jacket, and an emulsion previously formed by adding 10 ml of water and 0.21 g of an emulsifying agent (Emulgen 1108, made by Kao Corporation) to 5 g of allyl tri-n-butyl tin is added together with 990 ml of water, and then stirred at room temperature for 30 minutes while bubbling with nitrogen. Then, 1.2 g of tert-butyl hydroperoxide and 1.2 g of tetraethylene pentamine are added as a polymerization initiator to conduct reaction at 40° C. for 30 minutes, whereby a modified natural rubber latex is obtained.

(2) Step of Coagulation and Drying

Then, the modified natural rubber latex is coagulated by adding formic acid to adjust pH to 4.7. The thus obtained solid matter is treated by a clapper 5 times and crumbed through a shredder and dried by a hot air drier at 110° C. for 210 minutes to obtain a modified natural rubber P. It is confirmed from the weight of the thus obtained modified natural rubber P that a conversion of allyl tri-n-butyl tin as a tin-containing monomer is 100%. Also, as the separation of a homopolymer is carried out by extracting the modified natural rubber P with a petroleum ether and further extracting with a 2:1 mixed solvent of acetone and methanol, it is confirmed that the homopolymer is not detected from the analysis of the extract and 100% of the monomer added is introduced into the natural rubber molecule.

Production Examples 17-19

Modified natural rubbers Q, R, S are obtained in the same manner as in Production Example 16 except that 7.3 g of allyl tri-n-octyl tin in Production Example 17, 6.0 g of acryloxy tri-n-butyl tin in Production Example 18, and 5.2 g of vinyl tri-n-butyl tin in Production Example 19 are used instead of 5 g of allyl tri-n-butyl tin, respectively. As the modified natural rubbers Q-S are analyzed in the same manner as in Production Example 16, it is confirmed that 100% of the monomer added is introduced into the natural rubber molecule.

Production Example 20

A solid natural rubber T is obtained by directly coagulating and drying natural rubber latex without modification.

Examples 41-44, Comparative Example 6

A rubber composition is prepared by using the modified natural rubbers P-S obtained in Production Examples 16-19, respectively, according to a compounding recipe shown in Table 5. For the comparison, a rubber composition is prepared by using the natural rubber T of Production Example 20 according to the same compounding recipe.

TABLE 5

| | Part by mass |
|---|---|
| Modified natural rubber | 100 |
| Carbon black N339 | 50 |
| Aromatic oil | 5 |
| Stearic acid | 2 |
| Antioxidant 6C *1 | 1 |
| Zinc white | 3 |
| Vulcanization accelerator DZ *2 | 0.8 |
| Sulfur | 1 |

*1: N-(1,3-dimethylbutyl)-N'-phenyl-p-phenylene diamine
*2: N,N'-dicyclohexyl-2-benzothiazolyl sulfenamide With respect to these rubber compositions is measured a Mooney viscosity (ML$_{1+4}$, 130° C.). Further, the properties of a vulcanizate such as tensile strength (MPa), loss factor (tan δ, 50° C.) and wear resistance (represented by an index on the basis that Comparative Example 6 is 100) are measured after the rubber composition is vulcanized at 145° C. for 33 minutes. The measured results are shown in Table 6.

Moreover, the measuring method of each property is as follows.

(1) The Mooney Viscosity of the Rubber Composition (ML1+4, 130° C.) is Measured According to JIS K6300-1994.

(2) Tensile Strength

A strength at break (Tb) is measured according to JIS K6301-1995.

(3) tan δ

A value of tan δ is measured by using a viscoelasticity measuring device (made by Rheometrix Corporation) under conditions that a temperature is 50° C., a strain is 5% and a frequency is 15 Hz. The smaller the value, the lower the loss factor.

(4) Wear Resistance

The wear resistance is evaluated by measuring a worn amount at a slip ratio of 60% and room temperature by means of a Lambourn abrasion tester and represented by an index on the basis that Comparative Example 6 is 100. The larger the index value, the better the wear resistance.

TABLE 6

|  | Example 41 | Example 42 | Example 43 | Example 44 | Comparative Example 6 |
|---|---|---|---|---|---|
| Modified natural rubber | P | Q | R | S | T |
| Mooney viscosity (ML$_{1+4}$, 130° C.) | 79 | 78 | 76 | 77 | 73 |
| Tb (MPa) | 27.2 | 27.3 | 27.0 | 26.9 | 25.3 |
| tan δ (50° C.) | 0.143 | 0.145 | 0.154 | 0.152 | 0.182 |
| Wear resistance (index) | 126 | 125 | 117 | 119 | 100 |

As seen from the results of Table 6, the rubber compositions comprising the modified natural rubbers P-S of Examples 41-44 are superior in all of the tensile strength, loss factor (tan δ) and wear resistance to the rubber composition of Comparative Example 6.

Production Example 21

(1) Step of Modifying Natural Rubber Latex

A field latex is subjected to a centrifugal separation with a latex separator (made by Saito Enshin Kogyo Co., Ltd.) at a revolution speed of 7500 rpm to obtain a concentrated latex having a dry rubber concentration of 60%. 1000 g of the concentrated latex is charged into a stainless reaction vessel provided with a stirrer and a temperature-regulated jacket, and 1000 ml of water, 0.19 g of an emulsifying agent (Emulgen 1108, made by Kao Corporation) and 4.1 g of γ-methacryloxypropyl trimethoxy silane are added, and then stirred for 15 minutes while bubbling with nitrogen. Then, 1.2 g of tert-butyl hydroperoxide and 1.2 g of tetraethylene pentamine are added as a polymerization initiator to conduct reaction at 40° C. for 30 minutes, whereby a modified natural rubber latex is obtained.

(2) Step of Coagulation and Drying

Then, the modified natural rubber latex is coagulated by adding formic acid to adjust pH to 4.7. The thus obtained solid matter is treated by a clapper 5 times and crumbed through a shredder and dried by a hot air drier at 110° C. for 210 minutes to obtain a modified natural rubber U. It is confirmed from the weight of the thus obtained modified natural rubber U that a conversion of γ-methacryloxypropyl trimethoxy silane as an alkoxysilyl group-containing monomer is 100%. Also, as the separation of a homopolymer is carried out by extracting the modified natural rubber U with a petroleum ether and further extracting with a 2:1 mixed solvent of acetone and methanol, it is confirmed that the homopolymer is not detected from the analysis of the extract and 100% of the monomer added is introduced into the natural rubber molecule.

Production Examples 22-24

Modified natural rubbers V, W, X are obtained in the same manner as in Production Example 21 except that 2.4 g of vinyltrimethoxy silane in Production Example 22, 3.1 g of vinyltriethoxy silane in Production Example 23, and 6.4 g of N-[2-(vinylbenzylamino)ethyl]-3-aminopropyl trimethoxy silane in Production Example 24 are used instead of 4.1 g of γ-methacryloxypropyl trimethoxy silane, respectively. As the modified natural rubbers V-X are analyzed in the same manner as in Production Example 21, it is confirmed that 100% of the monomer added is introduced into the natural rubber molecule.

Production Example 25

A solid natural rubber Y is obtained by directly coagulating and drying natural rubber latex without modification.

Examples 45-48, Comparative Example 7

A rubber composition is prepared by using the modified natural rubbers U-X obtained in Production Examples 21-24, respectively, according to a compounding recipe shown in Table 7. For the comparison, a rubber composition is prepared by using the natural rubber Y of Production Example 25 according to the same compounding recipe.

TABLE 7

|  | Part by mass |
|---|---|
| Modified natural rubber | 100 |
| Silica *1 | 55 |
| Silane coupling agent *2 | 5.5 |
| Aromatic oil | 10 |
| Stearic acid | 2 |
| Antioxidant 6C *3 | 1 |
| Zinc white | 3 |
| Vulcanization accelerator DRG *4 | 1 |
| Vulcanization accelerator DM *5 | 1 |
| Vulcanization accelerator NS *6 | 1 |
| Sulfur | 1 |

*1: Nipsil AQ, made by Nippon Silica Kogyo Co., Ltd.
*2: Si69, made by Degussa, bis(3-triethoxysiylypropyl) tetrasulfide
*3: N-(1,3-dimethylbutyl)-N'-phenyl-p-phenylene diamine
*4: N,N'-dicyclohexyl-2-benzothiazolyl sulfenamide
*5: diphenyl guanidine
*6: dibenzothiazyl disulfide
*7: N-t-butyl-2-benzothiazyl sulfenamide With respect to these rubber compositions is measured a Mooney viscosity (ML$_{1+4}$, 130° C.). Further, the properties of a vulcanizate such as tensile strength (MPa), loss factor (tan δ, 50° C.) and wear resistance (represented by an index on the basis that Comparative Example 7 is 100) are measured after the rubber composition is vulcanized at 160° C. for 15 minutes. The measured results are shown in Table 8.

Moreover, the measuring method of each property is as follows.

(1) The Mooney Viscosity of the Rubber Composition ML1+4, 130° C.) is Measured According to JIS K6300-1994.

(2) Tensile Strength

A strength at break (Tb) is measured according to JIS K6301-1995.

(3) tan δ

A value of tan δ is measured by using a viscoelasticity measuring device (made by Rheometrix Corporation) under conditions that a temperature is 50° C., a strain is 5% and a frequency is 15 Hz. The smaller the value, the lower the loss factor.

(4) Wear Resistance

The wear resistance is evaluated by measuring a worn amount at a slip ratio of 60% and room temperature by means of a Lambourn abrasion tester and represented by an index on the basis that Comparative Example 7 is 100. The larger the index value, the better the wear resistance.

TABLE 8

|  | Example 45 | Example 46 | Example 47 | Example 48 | Comparative Example 7 |
|---|---|---|---|---|---|
| Modified natural rubber | U | V | W | X | Y |
| Mooney viscosity (ML$_{1+4}$, 130° C.) | 90 | 89 | 88 | 92 | 86 |
| Tb (MPa) | 25.3 | 25.1 | 25.1 | 25.4 | 23.7 |
| tan δ (50° C.) | 0.102 | 0.107 | 0.106 | 0.098 | 0.129 |
| Wear resistance (index) | 125 | 119 | 120 | 128 | 100 |

As seen from the results of Table 8, the rubber compositions comprising the modified natural rubbers U-X of Examples 45-48 are superior in all of the tensile strength, loss factor (tan δ) and wear resistance to the rubber composition of Comparative Example 7.

INDUSTRIAL APPLICABILITY

As mentioned above, the modified natural rubbers according to the first aspect of the invention develop the effect of considerably improving the odor reduction in the mastication and the freeze resistance in the storing while maintaining the physical properties inherent to natural rubber as compared with the conventional non-modified natural rubber and are excellent in the reinforcing property and affinity to the filler such as carbon black, silica or the like as compared with the conventional non-modified natural rubber. When such a modified natural rubber is used to form a rubber composition containing carbon black and/or silica, there is obtained the effect of considerably improving the loss factor and wear resistance of the rubber composition. Further, when such a rubber composition is applied to a tire constituting member of a pneumatic tire, there can be produced a tire having excellent loss factor and wear resistance.

Also, the modified natural rubber latex and modified natural rubber according to the fifth and sixth aspects of the invention are excellent in the reinforcing property and affinity to carbon black as compared with the conventional non-modified natural rubber. Therefore, when such a modified natural rubber is used to form a rubber composition containing carbon black, there is obtained the effect of considerably improving the loss factor and wear resistance of the rubber composition.

Furthermore, the modified natural rubber latex and modified natural rubber according to the tenth and eleventh aspects of the invention are excellent in the reinforcing property and affinity to silica as compared with the conventional non-modified natural rubber. Therefore, when such a modified natural rubber is used to form a rubber composition containing silica, there is obtained the effect of considerably improving the loss factor and wear resistance of the rubber composition.

The invention claimed is:

1. A rubber composition comprising a modified natural rubber, which is obtained by graft-polymerizing natural rubber latex with a polar group-containing monomer and then coagulating and drying, and carbon black and/or silica, wherein a grafting ratio of the polar group-containing monomer is 0.01-5.0% by mass per the natural rubber latex, and a content of the modified natural rubber component of the rubber composition is at least 15% by mass.

2. A rubber composition according to claim 1, wherein the grafting ratio is 0.1-3.0% by mass per the natural rubber latex.

3. A rubber composition according to claim 1, wherein the polar group is at least one selected from the group consisting of amino group, imino group, nitrile group, ammonium group, imido group, amido group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group and oxygen-containing heterocyclic group.

* * * * *